United States Patent
Shibayama et al.

(10) Patent No.: US 9,961,534 B2
(45) Date of Patent: May 1, 2018

(54) PROGRAM AND INFORMATION PROCESSING APPARATUS

(71) Applicant: AGOOP Corp., Tokyo (JP)

(72) Inventors: Kazuhisa Shibayama, Tokyo (JP); Yuji Soga, Tokyo (JP); Yusuke Kato, Tokyo (JP)

(73) Assignee: AGOOP Corp., Tokyo (JP)

( * ) Notice: Subject to any disclaimer, the term of this patent is extended or adjusted under 35 U.S.C. 154(b) by 0 days. days.

(21) Appl. No.: 15/361,505

(22) Filed: Nov. 28, 2016

(65) Prior Publication Data
US 2017/0078868 A1 Mar. 16, 2017

Related U.S. Application Data

(63) Continuation of application No. PCT/JP2014/002863, filed on May 29, 2014.

(51) Int. Cl.
| | |
|---|---|
| *H04W 16/18* | (2009.01) |
| *H04W 8/12* | (2009.01) |
| *H04W 64/00* | (2009.01) |
| *H04W 8/22* | (2009.01) |
| *H04W 24/08* | (2009.01) |

(52) U.S. Cl.
CPC ............. *H04W 8/12* (2013.01); *H04W 16/18* (2013.01); *H04W 8/22* (2013.01); *H04W 24/08* (2013.01); *H04W 64/003* (2013.01)

(58) Field of Classification Search
CPC ......... H04W 8/12; H04W 8/22; H04W 16/18; H04W 64/003; H04W 24/08
See application file for complete search history.

(56) References Cited

U.S. PATENT DOCUMENTS

| | | | | |
|---|---|---|---|---|
| 6,359,571 | B1 * | 3/2002 | Endo | G01C 21/26 340/905 |
| 2009/0209282 | A1 | 8/2009 | Kobayashi et al. | |
| 2010/0029263 | A1 | 2/2010 | Senoo et al. | |
| 2010/0190449 | A1 * | 7/2010 | Suzuki | H04W 4/02 455/67.11 |

(Continued)

FOREIGN PATENT DOCUMENTS

| | | |
|---|---|---|
| JP | 2003-249887 A | 9/2003 |
| JP | 2004-214875 A | 7/2004 |

(Continued)

OTHER PUBLICATIONS

List of apps uploaded to iPhone App Store and Android GooglePlay related to JP2013-050947 (see attached list).

(Continued)

*Primary Examiner* — Khai M Nguyen

(57) ABSTRACT

To judge whether there is roaming, a computer is caused to perform a position information acquisition procedure to acquire position information of the computer, a connection carrier information acquisition procedure to acquire connection carrier identification information for identifying a communication carrier of a communication network to which the computer is connected at the position where the position information was acquired, and a log information generation procedure to generate log information in which the position information and the connection carrier identification information are associated with each other.

19 Claims, 7 Drawing Sheets

(56) References Cited

U.S. PATENT DOCUMENTS

| | | |
|---|---|---|
| 2011/0219226 A1 | 9/2011 | Olsson et al. |
| 2012/0149391 A1* | 6/2012 | Honjo ................. H04W 48/16 |
| | | 455/456.1 |
| 2013/0072107 A1* | 3/2013 | Kitazato ............... H04H 20/57 |
| | | 455/3.01 |
| 2013/0203456 A1 | 8/2013 | Hapsari et al. |
| 2014/0004886 A1 | 1/2014 | Gillett et al. |
| 2014/0155056 A1 | 6/2014 | Jactat et al. |
| 2015/0161827 A1* | 6/2015 | Getchius ................ G07C 5/02 |
| | | 701/519 |
| 2015/0245284 A1 | 8/2015 | Ishikawa et al. |
| 2015/0281933 A1* | 10/2015 | Hasesaka ............... H04W 4/22 |
| | | 455/404.1 |

FOREIGN PATENT DOCUMENTS

| | | |
|---|---|---|
| JP | 2011-124953 A | 6/2011 |
| JP | 2011176640 A | 9/2011 |

OTHER PUBLICATIONS

List of apps uploaded to iPhone App Store and Android GooglePlay related to JP2012-287569 (see attached list).
International Search Report for International Application No. PCT/JP2014/002863, issued by the Japan Patent Office dated Sep. 2, 2014.
Extended European Search Report for European Patent Application No. 14 893 392.2, issued by the European Patent Office dated May 24, 2017.
Office Action issued for counterpart Japanese Application 2016-522982, issued by the Japan Patent Office dated Dec. 19, 2017.

* cited by examiner

FIG. 3

| TERMINAL ID | DATE AND TIME | POSITION INFORMATION | GPS ACCURACY | COMMUNICATION ENVIRONMENT INFORMATION | | |
|---|---|---|---|---|---|---|
| | | | | COMMUNICATION POSSIBILITY | THROUGHPUT | LATENCY |
| 0001 | 2012/12/10 ... | *** | *** | *** | *** | *** |
| 0001 | 2012/12/10 ... | *** | *** | *** | *** | *** |
| ... | ... | ... | ... | ... | ... | ... |
| 0002 | 2012/12/11 ... | *** | *** | *** | *** | *** |
| 0002 | 2012/12/11 ... | *** | *** | *** | *** | *** |
| ... | ... | ... | ... | ... | ... | ... |
| 0003 | 2012/12/12 ... | *** | *** | *** | *** | *** |
| 0003 | 2012/12/12 ... | * | * | * | * | *** | on # PROGRAM AND INFORMATION PROCESSING APPARATUS

The contents of the following PCT patent application are incorporated herein by reference:
NO. PCT/JP2014/002863 filed on May 29, 2014.

BACKGROUND

1. Technical Field

The present invention relates to a program and an information processing apparatus.

2. Related Art

A method is known for using a wireless communication terminal such as a mobile phone to measure line speed of a mobile communication network, such as shown in Patent Document 1, for example.

Patent Document 1: Japanese Patent Application Publication No. 2003-249887

In recent years, due to cooperation among communication carriers, roaming service has come into use to provide the same service received when a terminal is located within a service area of the communication carrier of a user with whom the user has a contract even when this terminal of the user is located outside of the service area. However, there is no known method for efficiently acquiring a geographical distribution of information relating to roaming.

SUMMARY

According to a first aspect of the present invention, provided is a program. A computer readable medium storing thereon the program may be provided. The program may cause a computer to perform a position information acquisition procedure to acquire position information of the computer. The program may cause a computer to perform a connection carrier information acquisition procedure to acquire connection carrier identification information for identifying a communication carrier of a communication network to which the computer is connected at the position where the position information was acquired. The program may cause a computer to perform a log information generation procedure to generate log information in which the position information and the connection carrier identification information are associated with each other.

The program may further cause the computer to perform a contract carrier information acquisition procedure to acquire contract carrier identification information for identifying a communication carrier contracted to provide the computer with a communication service. The log information generation procedure may include a procedure to generate the log information in which the position information, the connection carrier identification information, and the contract carrier information are associated with each other.

The program may further cause the computer to perform a communication environment information acquisition procedure to acquire information relating to the communication environment at the position where the position information was acquired. The log information generation procedure may include a procedure to generate the log information in which the position information, the connection carrier identification information, and the information relating to the communication environment are associated with each other.

The program may further cause the computer to perform a first communication environment information acquisition procedure to acquire the information relating to the communication environment when a predetermined event has occurred. The program may further cause the computer to perform a second communication environment information acquisition procedure to acquire the information relating to the communication environment during a predetermined first period from when the first communication environment information acquisition procedure was performed In the program, the predetermined event may be at least one event selected from a group made up of (i) receiving user instructions designating the performance of a process other than the process for acquiring the information relating to the communication environment, (ii) passage of a predetermined second period from when the program transitioned to a background operating state, (iii) passage of a predetermined third period from when the process for acquiring the information relating to the communication environment was previously performed, and (iv) reaching a predetermined time. In the program, the first period is shorter than the second period or the third period. The program may further cause the computer to perform a log information transmission procedure to transmit the log information to a server that gathers the log information.

According to a second aspect of the present invention, provided is an information processing apparatus. The information processing apparatus may comprise a communication control section connected to a communication network. The information processing apparatus may comprise a position information acquiring section that acquires position information. The information processing apparatus may comprise a connection carrier information acquiring section that acquires connection carrier identification information for identifying a communication carrier of a communication network to which the communication control section is connected at a position where the position information was acquired. The information processing apparatus may comprise a log information generating section that generates log information in which the position information and the connection carrier identification information are associated with each other.

According to a third aspect of the present invention, provided is a program. A computer readable medium storing thereon the program may be provided. The program may cause a computer to perform a first communication environment information acquisition procedure to acquire information relating to a communication environment when a predetermined event has occurred. The program may cause a computer to perform a second communication environment information acquisition procedure to acquire the information relating to the communication environment during a predetermined first period from when the first communication environment information acquisition procedure was performed.

In the program, the predetermined event may be at least one event selected from a group made up of (i) receiving user instructions designating the performance of a process other than the process for acquiring the information relating to the communication environment, (ii) passage of a predetermined second period from when the program transitioned to a background operating state, (iii) passage of a predetermined third period from when the process for acquiring the information relating to the communication environment was previously performed, and (iv) reaching a predetermined time. In the program, the first period may be shorter than the second period or the third period.

The program may cause a computer to perform the second communication environment information acquisition procedure when a predetermined fourth period has passed from when the first communication environment information acquisition procedure was performed. In the program, the fourth period may be equal to the first period or shorter than the first period.

In the program, at least one of the first communication environment information acquisition procedure and the second communication environment information acquisition procedure may include a procedure to transmit a request to an external information processing apparatus; a procedure to receive a response to the request from the external information processing apparatus; and a procedure to judge communication to be impossible when the response is not received during a predetermined fifth period. The program may further causing the computer to perform a position information acquisition procedure to acquire position information of a position where the information relating to the communication environment of the computer was acquired. The program may further causing the computer to perform a log information generation procedure to generate the log information in which the position information and the information relating to the communication environment are associated with each other.

According to a fourth aspect of the present invention, provided is an information processing apparatus. The information processing apparatus may comprise a communication control section connected to a communication network. The information processing apparatus may comprise a communication environment information acquiring section that acquires information relating to a communication environment. The communication environment information acquiring section may perform a first communication environment information acquisition procedure to acquire the information relating to the communication environment when a predetermined event has occurred; and a second communication environment information acquisition procedure to acquire the information relating to the communication environment during a predetermined first period from when the first communication environment information acquisition procedure was performed.

In the information processing apparatus, the predetermined event may be at least one event selected from a group made up of (i) receiving user instructions designating the performance of a process other than the process for acquiring the information relating to the communication environment, (ii) passage of a predetermined second period from when the communication environment information acquiring section transitioned to a background operating state, (iii) passage of a predetermined third period from when the process for acquiring the information relating to the communication environment was previously performed, and (iv) reaching a predetermined time. The first period may be shorter than the second period or the third period.

The summary clause does not necessarily describe all necessary features of the embodiments of the present invention. The present invention may also be a sub-combination of the features described above.

BRIEF DESCRIPTION OF THE DRAWINGS

FIG. 3 schematically shows an exemplary log information data table 300.

DESCRIPTION OF EXEMPLARY EMBODIMENTS

Figure 1:
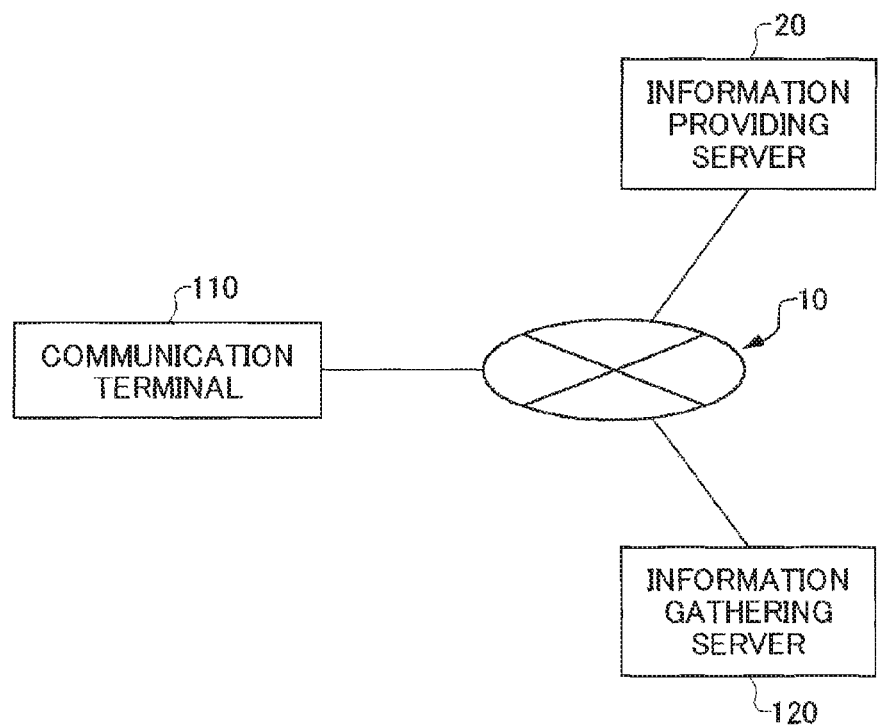
FIG. 1 schematically shows an exemplary communication state analyzing system 100.

Hereinafter, some embodiments of the present invention will be described. The embodiments do not limit the invention according to the claims, and all the combinations of the features described in the embodiments are not necessarily essential to means provided by aspects of the invention. In the drawings, similar or identical portions are given the same reference numerals, and redundant descriptions are omitted.

FIG. 1 schematically shows an exemplary communication state analyzing system 100. In the present embodiment, the communication state analyzing system 100 includes a communication terminal 110 and an information gathering server 120. The communication state analyzing system 100 and the communication terminal 110 are an example of an information processing apparatus. The communication terminal 110 is an example of a computer that includes a communication function.

The communication terminal 110 and the information gathering server 120 exchange information through a communication network 10. The communication terminal 110 and the information providing server 20 exchange information through the communication network 10. The communication network 10 may be a wireless communication transmission path, or may be a combination of a wireless transmission path and a wired transmission path. The communication network 10 may be a mobile communication network, such as a mobile phone network, a wireless packet communication network, the Internet and a dedicated line, or a combination of these.

The information providing server 20 and the information gathering server 120 may each be realized as an information processing apparatus with a normal configuration that operates according to software or programs that define the operations of each component in the information providing server 20 and the information gathering server 120. The information processing apparatuses used as the information providing server 20 and the information gathering server 120 may include a data processing apparatus having a processor such as a CPU, a ROM, a RAM, and a communication interface; an input apparatus such as a keyboard, touch panel, or microphone; an output apparatus such as a display apparatus or speakers; and a storage apparatus such as a memory or HDD. The data processing apparatus or the storage apparatus may store the software or programs mentioned above. The information providing server 20 and the information gathering server 120 are examples of an information processing apparatus that includes a processor and a storage apparatus that stores the commands or programs to be executed by the processor. The commands or programs are executed by the processor to cause the information processing apparatus to perform the operations defined by the commands or programs.

The information providing server 20 and the information gathering server 120 may each be a virtual server or cloud system. Furthermore, the functions of the information providing server 20 and the information gathering server 120 may be realized by a plurality of servers.

The information providing server 20 provides a service to a user of the communication terminal 110, by providing information to the communication terminal 110 via the communication network 10. The service provided by the information providing server 20 may be an information searching service, a map navigation service, a mail service, a video or audio data distribution service, an electronic document distribution service, or the like. The information providing server 20 receives from the communication terminal 110 a transmission request relating to information designated by the user of the communication terminal 110. The information providing server 20 transmits the information to the communication terminal 110, in response to the transmission request from the communication terminal 110.

The communication terminal 110 has a communication function. The communication terminal 110 may have a wireless communication function. The communication terminal 110 may be capable of using a plurality of communication systems. For example, the communication terminal 110 may be capable of using both mobile communication systems such as 3G, LTE, and 4G and wireless communication systems such as WiFi (Registered Trademark) and WiMAX (Registered Trademark). The communication terminal 110 need only be capable of exchanging information with the information providing server 20 and the information gathering server 120, and may be a wireless terminal, mobile terminal (e.g. a PDA, tablet, notebook computer, or laptop computer), a mobile telephone, or a personal computer with web-browsing software installed.

The communication terminal 110 may be realized by an information processing apparatus with a normal configuration executing software or programs that define the operations of components in the communication terminal 110. The information processing apparatus used as the communication terminal 110 may include a data processing apparatus having a processor such as a CPU, a ROM, a RAM, and a communication interface; an input apparatus such as a keyboard, touch panel, microphone, GPS information acquiring apparatus, acceleration sensor, or gyro sensor; an output apparatus such as a display apparatus, speakers, or a vibrating apparatus; and a storage apparatus such as a memory or HDD. The data processing apparatus or the storage apparatus may store the software or programs mentioned above. The communication terminal 110 is an example of an information processing apparatus that has a communication function and includes a processor and a storage apparatus that stores the commands or programs to be executed by the processor. The commands or programs are executed by the processor to cause the information processing apparatus to perform the operations defined by the commands or programs.

The communication terminal 110 receives user instructions, and performs the process designated by the user instructions. The user instructions may instruct the communication terminal 110 to perform a process other than a process for acquiring information relating to the communication environment. When the user instructions are received, the communication terminal 110 acquires information relating to the communication environment of the communication terminal 110 (sometimes referred to hereinafter as "communication environment information") and position information that indicates the location at which the communication environment information was acquired. When the process designated by the user instructions is performed, the communication terminal 110 may acquire the communication environment information and the position information. The position information may include at least information relating to the communication environment information and the position information. The communication terminal 110 transmits to the information gathering server 120 at least information associated with the communication environment information and the position information (sometimes referred to hereinafter as "log information").

The communication environment information can be exemplified by information relating to communication possibility, radio wave state (e.g. radio wave reception level, radio wave strength, RSCP (Received Signal Code Power), CID (Cell ID)), communication quality (e.g. communication speed, data communication throughput, or data communication latency), communication system, or communication carrier. The communication environment information may include information concerning a network other than information relating to radio waves. The "communication possibility" may be such that communication is not possible (sometimes referred to hereinafter as "communication impossible") when the radio wave level is less than a predetermined level (e.g. when out of range).

The communication possibility may be judged based on a result obtained by repeating, a plurality of times, a process of acquiring information relating to a prescribed radio wave state or communication quality (sometimes referred to hereinafter as a "test"). For example, communication may be judged to be possible (sometimes referred to as "communication possible") when a percentage of tests indicating that the radio wave state or communication quality is better than a predetermined first threshold value, from among a predetermined number of tests, is greater than a second predetermined threshold value. In other cases, communication may be judged to be impossible (sometimes referred to as "communication impossible").

The log information may be information in which the communication environment information and the position information are associated with at least one of information indicating the time at which the communication environment information was acquired, information indicating the GPS strength at the time when the position information was acquired, and information relating to the communication terminal 110. The information relating to the communication terminal 110 can be exemplified by terminal identification information identifying each communication terminal 110, information indicating the type of the communication terminal 110, and information indicating the OS of the communication terminal 110.

The information indicating the time at which the communication environment information was acquired may indicate the time at which the communication terminal 110 began the process for acquiring the communication environment information, the time at which the communication terminal 110 finished the process for acquiring the communication environment information, or the time at which the communication terminal 110 received the user instructions. The terminal identification information is an example of identification information for identifying a computer.

The terminal identification information is not particularly limited as long as it enables identification of each communication terminal 110, and is preferably capable of identifying the communication terminals 110 without specifying a user. In this way, the information gathering server 120 can analyze the log information by referencing the temporal relationship of pieces of log information, without specifying the user.

For example, the terminal identification information of a specified communication terminal 110 may be a randomly selected code sequence. The code sequence may be unique to each of the one or more communication terminals 110, or may be reused among a plurality of communication terminals 110. The terminal identification information may be updated at predetermined intervals, or may be updated at a given timing.

The information gathering server 120 receives the log information from each of the one or more communication terminals 110. The information gathering server 120 may store the received log information in a storage apparatus. The information gathering server 120 may analyze the communication state by using the log information.

Figure 2:
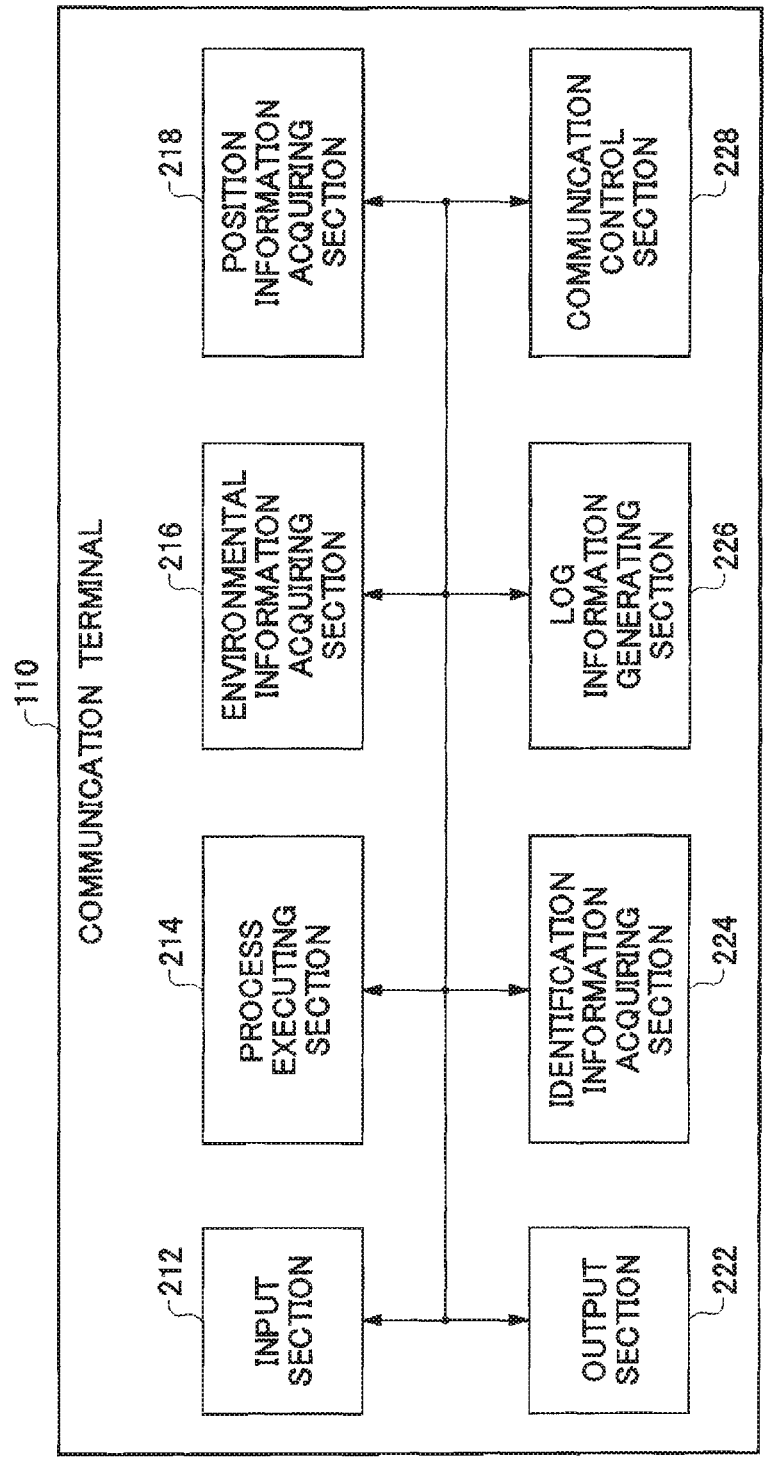
FIG. 2 schematically shows an exemplary communication terminal 110.

FIG. 2 schematically shows an exemplary communication terminal 110. In the description of FIG. 2, portions that overlap with the description relating to FIG. 1 may be omitted. In the present embodiment, the communication terminal 110 includes an input section 212, a process executing section 214, an environment information acquiring section 216, a position information acquiring section 218, an output section 222, an identification information acquiring section 224, a log information generating section 226, and a communication control section 228. The components of the communication terminal 110 exchange information with each other. The environment information acquiring section 216 may be an example of a communication environment information acquiring section. The identification information acquiring section 224 may be an example of at least one of a terminal information acquiring section, a connection carrier information acquiring section, and a contract carrier information acquiring section.

Each component of the communication terminal 110 may be realized by hardware, software, or a combination of hardware and software. By executing a program, a computer may function as a portion of the communication terminal 110. The program may be stored in a computer-readable medium such as a CD-ROM, DVD-ROM, memory, or hard disk, or may be stored in a storage apparatus connected to the network. The program may be installed in the computer of the communication terminal 110 from the storage apparatus connected to the network or the computer-readable medium.

The program that causes the computer to function as a portion of the communication terminal 110 may include a module that defines the operation of each component of the communication terminal 110. These programs and modules work on the processor, communication interface, and GPS information acquiring apparatus, for example, to cause the computer to function as each component of the communication terminal 110 and perform the information processing of the communication terminal 110.

The information process written in these programs is read by the computer and functions as a concrete means by which software and the hardware resources of the communication terminal 110 operate together. With this concrete means, the communication terminal 110 can be constructed for an intended use by realizing computation and processing of information corresponding to the intended use of the computer in the present embodiment.

The input section 212 receives the user instructions from the user. The input section 212 may be a keyboard, touch panel, or microphone. The user instructions instruct the communication terminal 110 to perform a process other than a process for acquiring information relating to the communication environment. Accordingly, instructions requesting only the acquisition of information for measuring line speed or communication speed and instructions requesting only access to a server providing a service for measuring line speed or communication speed are not included in the scope of the user instructions. The input section 212 is an example of a user request handling section.

The process executing section 214 performs the process designated by the user instructions. The process designated by the user instructions may be a process using the communication function, or may be a process that does not use the communication function.

The process designated by the user instructions may be a process performed at the time when the communication terminal 110 receives the user instructions. The process designated by the user instructions may be a process that is automatically performed at a predetermined time or every time that a predetermined time passes according to the user settings, or may be a process that is automatically performed at a predetermined time or every time that a predetermined time passes according to the initial setting of the communication terminal 110 or the initial setting of the program executed by the communication terminal 110.

The process designated by the user instructions may be a process for outputting information designated by the user instructions in a format that can be understood by the user. Such a process can be exemplified by a process of scrolling through a display screen of the communication terminal 110 and changing the display position of an image shown in the display screen, or a process of accessing the information providing server 20, acquiring information designated by the user from the information providing server 20, and displaying the acquired information in the display screen of the communication terminal 110.

The process designated by the user instructions may be a process associated with the flipping of a switch or the pressing of a button of the communication terminal 110. The process designated by the user instructions may be a process for turning OFF the power supply of the communication terminal 110. The process designated by the user instructions may be a process of logging off from the communication terminal 110, or a process for setting the communication terminal 110 to a sleep state.

The environment information acquiring section 216 acquires the communication environment information of the communication terminal 110 (sometimes referred to as "performing a communication environment information acquisition procedure"). When a predetermined event has occurred, the environment information acquiring section 216 may acquire the communication environment information of the communication terminal 110. The predetermined event can be exemplified by at least one event selected from a group made up of (i) receiving user instructions designating the performance of a process other than the process for acquiring the communication environment information, (ii) passage of a predetermined period (may be an example of a second period) from when the environment information acquiring section 216 transitioned to a background operating state, (iii) passage of a predetermined period (may be an example of a third period) from when the process for acquiring the communication environment information was previously performed, and (iv) reaching a predetermined time.

As an example, when the user instructions are received, the environment information acquiring section 216 acquires the communication environment information of the communication terminal 110, separately from the process designated by the user instructions. When the process executing section 214 performs the process designated by the user instructions, the environment information acquiring section 216 may acquire the communication environment information separately from the process designated by the user instructions. The environment information acquiring section 216 may acquire the communication environment information at a predetermined time or each time that a predetermined time has passed (these timings may be referred to hereinafter as "the communication environment information acquisition timing").

When the predetermined event described above has occurred, the environment information acquiring section 216 may perform a first communication environment information acquisition procedure to acquire information relating to the communication environment and a second communication environment information acquisition procedure to acquire information relating to the communication environment during a predetermined period (may be an example of a first period, and the first period may be shorter than the second period or the third period) from when the first communication environment information acquisition procedure was performed. The environment information acquiring section 216 may perform the second communication environment information acquisition procedure when a period (may be an example of a fourth period, and the fourth period may be equal to the first period or shorter than the first period) that is shorter than the predetermined period described above has passed from when the first communication environment information acquisition procedure was performed.

The communication environment information acquisition process may be further repeated during the predetermined period described above. When a communication session switching process, a network switching process, a handover process, or the like has been detected, the environment information acquiring section 216 may perform the communication environment information acquisition procedure a plurality of times during the predetermined period described above. The period from when the first communication environment information acquisition procedure is performed to when the second communication environment information acquisition procedure is performed may be less than or equal to 5 minutes, less than or equal to 3 minutes, less than or equal to 2 minutes, less than or equal to 1 minute, less than or equal to 30 seconds, less than or equal to 20 seconds, less than or equal to 15 seconds, less than or equal to 10 seconds, or less than or equal to 5 seconds.

At least one of the first communication environment information acquisition procedure and the second communication environment information acquisition procedure may include a procedure for transmitting a request to the information providing server 20 (may be an example of an external information processing apparatus), a procedure for receiving a response to the above request from the information providing server 20, and a procedure for judging that communication is impossible when the above response is not received within a predetermined period (may be an example of a fifth period, and the fifth period may be shorter than the fourth period). Furthermore, a procedure may be included for acquiring the communication environment information such as the communication speed based on the time needed after a request to transmit information has been sent to the information providing server 20 until this information is acquired from the information providing server 20 and on the amount of this information.

When the environment information acquiring section 216 performs the communication environment information acquisition procedure, there are cases where the communication session switching process, the network switching process, the handover process, or the like occurs. The communication session switching process occurs when switching between a phone call session and a data communication session, for example. The network switching process occurs when changing the communication system among communication systems such as 2G, 3G, and LTE, or when roaming into a communication network of another communication carrier.

When the communication session switching process, the network switching process, the handover process, or the like occurs, there is a possibility that this process will affect the measurement result of the communication environment information. For example, when measuring the communication speed based on the time needed after the request to transmit information has been sent to the information providing server 20 until this information is acquired from the information providing server 20 and on the amount of this information, if the communication session switching process, the network switching process, the handover process, or the like occurs, the measurement result for the communication speed becomes lower than the actual communication speed. Depending on the time needed to perform the communication session switching process, the network switching process, the handover process, or the like, there is also a possibility that communication will be judged to be impossible. In such a case as well, it is possible to more accurately measure the communication environment information by performing the communication environment information acquisition procedure a plurality of times during a predetermined period.

As one embodiment, when the input section 212 receives user instructions that designate activation of a GPS logger, the environment information acquiring section 216 acquires the communication environment information every time the GPS logger acquires log information at a prescribed time period. As another embodiment, when the input section 212 receives user instructions that designate activation of e-mail software, the environment information acquiring section 216 acquires the communication environment information every time the e-mail software accesses the mail server in the background. As yet another embodiment, when the input section 212 receives user instructions that designate setting of a wakeup function, the environment information acquiring section 216 acquires the communication environment information when the wakeup function is set or when the wakeup function activates.

The environment information acquiring section 216 may acquire the communication environment information based on the time needed from when a request is issued to the information providing server 20 to transmit the information designated by the user until the information is acquired from the information providing server 20 and on the amount of this information. The process of acquiring the communication environment information may be performed in the background.

In this way, the communication environment information can be acquired while the user manipulates the communication terminal 110. Furthermore, even when the communication terminal 110 executes a process that does not use the communication function, the communication environment information can be acquired. Yet further, the communication environment information can be acquired without the user performing a prescribed manipulation to acquire the communication environment information. As a result, a communication state close to the actual usage state of the user can be understood over a wide area. Furthermore, the change of the communication state over time can be understood.

When the user instructions are received, the position information acquiring section 218 acquires the position information of the communication terminal 110 separately from the process designated by the user instructions. When the process executing section 214 performs the process designated by the user instructions, the position information acquiring section 218 may acquire the position information separately from the process designated by the user instructions. The position information acquiring section 218 may acquire the position information when the environment information acquiring section 216 acquires the communication environment information. In this way, the communication environment information can be associated with the position information. The process for acquiring the position information may be performed in the background.

The position information acquiring section 218 may acquire the position information based on at least one of GPS information and radio wave information from an access point of a mobile communication network or a wireless communication network. The position information acquiring section 218 may be a GPS information acquiring apparatus, or may acquire the position information from a GPS information acquiring apparatus provided in the communication terminal 110. The position information acquiring section 218 may acquire information relating to GPS accuracy, along with the position information.

The output section 222 outputs the information designated by the user instructions, in a state that can be understood by the user. The output section 222 may be a display apparatus such as a liquid crystal display or an organic EL display; an audio output apparatus such as a speaker; or a vibrating apparatus such as a vibrator.

The output section 222 may change the image displayed on the screen or change the display position of the image displayed on the screen, for example, in response to the instructions from the user. The output section 222 may display an image based on information from the information providing server 20 via the communication network 10 or on information stored in the storage apparatus of the communication terminal 110. Furthermore, the output section 222 may output from the speaker, as audio information, the information from the information providing server 20 via the communication network 10 or the information stored in the storage apparatus of the communication terminal 110. In this way, the user can understand the information.

On the other hand, when a prescribed process is performed in the background, the information used for this process is not output from the output section 222 in a state that can be understood by the user. Therefore, the user is not aware of this information.

The identification information acquiring section 224 may acquire the terminal identification information for identifying each communication terminal 110. The identification information acquiring section 224 may generate the terminal identification information for each communication terminal 110, or may receive the terminal identification information from the information gathering server 120. The terminal identification information may be determined randomly using random numerals. The terminal identification information may be updated at a predetermined time or every time that a predetermined time has passed. The identification information acquiring section 224 may acquire information relating to the communication terminal 110, such as information indicating the type of the communication terminal 110 or information indicating the OS of the communication terminal 110.

The identification information acquiring section 224 may acquire identification information (sometimes referred to as "connection carrier identification information") for identifying the communication carrier (sometimes referred to as a "communication provider") of the communication network 10 to which the communication terminal 110 is connected. The identification information acquiring section 224 may acquire the connection carrier identification information of the communication network 10 to which the communication terminal 110 is connected at the position where the position information was acquired. The identification information for identifying the communication carrier can be exemplified by a code allocated to each of one or more communication carriers, a name of each of one or more communication carriers, or the like.

In one embodiment, the identification information acquiring section 224 may extract the connection carrier identification information included in communication packets by analyzing these communication packets. The connection carrier identification information included in the communication packets can be exemplified by an SID (System ID), a network operator PLMN (Public Land Mobile Network), a network operator carrier, or the like. The identification information acquiring section 224 may acquire information such as an NID (Network ID), an MCC (Mobile Country Code), or an MNC (Mobile Network Code) by analyzing the communication packets. The connection carrier identification information may be a combination of a plurality of types of information included in the communication packets. In another embodiment, the identification information acquiring section 224 may access an OS to acquire the connection carrier identification information. The OS analyzes the communication packets and acquires the connection carrier identification information included in the communication packets, for example.

If there is a link between the position information acquisition process performed by the position information acquiring section 218 and the connection carrier identification information acquisition process performed by the identification information acquiring section 224, then the position indicated by the position information acquired by the position information acquiring section 218 and the position where the identification information acquiring section 224 acquired the connection carrier identification information do not need to accurately match. For example, when the communication terminal 110 is moving, there are cases where the position indicated by the position information acquired by the position information acquiring section 218 and the position where the identification information acquiring section 224 acquired the connection carrier identification information do not accurately match.

In such a case as well, if there is a link between the position information acquisition process performed by the position information acquiring section 218 and the connection carrier identification information acquisition process performed by the identification information acquiring section 224, this connection carrier identification information may be treated as the connection carrier identification information at the position where the position information was acquired. A case in which there is a link between the position information acquisition process performed by the position information acquiring section 218 and the connection carrier identification information acquisition process performed by the identification information acquiring section 224 can be exemplified by a case in which the identification information acquiring section 224 acquires the connection carrier identification information along with the position information acquiring section 218 acquiring the position information, a case in which the position information acquiring section 218 acquires the position information along with the identification information acquiring section 224 acquiring the connection carrier identification information, and a case in which the position information acquisition process performed by the position information acquiring section 218 and the connection carrier identification information acquisition process performed by the identification information acquiring section 224 are both performed based on the same trigger (sometimes referred to as an "event").

In the present embodiment, the identification information acquiring section 224 may acquire identification information (sometimes referred to as "contract carrier identification information") for identifying a communication carrier contracted to provide communication service to a communication terminal 110 or a user of the communication terminal 110. The identification information acquiring section 224 may acquire the contract carrier identification information recorded in a SIM (Subscriber Identity Module) card of the communication terminal 110.

The contract carrier identification information recorded in the SIM card can be exemplified by a PLMN (Public Land Mobile Network) code, an MNC (Mobile Network Code), or a Carrier. The Carrier may be the name of a storage region for recording the name of a communication carrier. The contract carrier identification information may be a combination of a plurality of types of information recorded in the SIM card. The identification information acquiring section 224 may acquire the PLMN code by accessing the SIM card, or may acquire the PLMN code by accessing an OS.

The log information generating section 226 may acquire the communication environment information from the environment information acquiring section 216. The log information generating section 226 may acquire from the environment information acquiring section 216 information indicating the time at which the communication environment information was acquired. The log information generating section 226 may acquire from the position information acquiring section 218 the position information indicating the position at which the communication environment information was acquired. The log information generating section 226 may acquire from the position information acquiring section 218 the information relating to the GPS accuracy at the time that the position information was acquired. The log information generating section 226 may acquire at least one of the connection carrier identification information and the contract carrier identification information from the identification information acquiring section 224.

The log information generating section 226 generates the log information. The process of generating the log information may be performed in the background. The log information generating section 226 may generate the log information by associating at least two types of information selected from among a group made up of the communication environment information, the position information, the information indicating the timing at which the communication environment information was acquired, the information indicating the GPS strength at the time when the position information was acquired, the information relating to the communication terminal 110, the connection carrier identification information, and the contract carrier identification information.

The log information generating section 226 may at least generate the log information by associating the communication environment information and the position information. The log information generating section 226 may generate the log information by associating the position information and the connection carrier identification information with each other. The log information generating section 226 may generate the log information by associating the position information, the connection carrier identification information, and the information relating to the communication environment with each other. The log information generating section 226 may generate the log information by associating the position information, the connection carrier identification information, and the contract carrier identification information with each other.

In this way, by analyzing the log information including the connection carrier identification information and the position information, it is possible to acquire information relating to the geographical distribution of information relating to roaming. The information relating to roaming can be exemplified by information relating to whether there is roaming, information relating to the roaming, the communication carrier of the roaming destination, and information relating to the communication carrier of the roaming source. Furthermore, it is possible to acquire information relating to the geographical distribution of statistical information relating to the placement of base stations of each communication carrier.

The log information generating section 226 may detect whether there is roaming by comparing the connection carrier identification information and the contract carrier identification information. The log information generating section 226 may generate the log information by associating the position information indicating the position where the connection carrier identification information was acquired and whether there is roaming.

The log information generating section 226 may determine the communication system used when the communication environment information was acquired, based on the information relating the latency of the data communication included in the communication environment information. For example, if the latency is less than a predetermined value, the log information generating section 226 judges that the communication environment information acquired by the environment information acquiring section 216 was transmitted by the communication terminal 110 using a first communication system, such as LTE or 4G, for example. On the other hand, if the latency is greater than or equal to a predetermined value, the log information generating section 226 judges that the communication environment information acquired by the environment information acquiring section 216 was transmitted by the communication terminal 110 using a second communication system, such as 3G, for example. The log information generating section 226 may generate the log information by associating the information relating to the communication method used to acquire the communication environment information with the communication environment information and the position information.

The log information generating section 226 may generate an internal function of the OS operating on the communication terminal 110. The log information generating section 226 may determine the communication system used to acquire the communication environment information based on an acquired internal function.

The log information generating section 226 may generate log information each time the input section 212 receives user instructions. The log information generating section 226 may generate the log information each time a process designated by the user instructions is performed. The log information generating section 226 may generate the log information at a predetermined time or every time a predetermined time has passed (sometimes referred to hereinafter as the "log information generation timing"). The log information generation timing may be substantially the same as the communication environment information acquisition timing, or may be different.

The log information generating section 226 may transmit the generated log information to the information gathering server 120. The log information generating section 226 may transmit the log information to the information gathering server 120 every time log information is generated. The log information generating section 226 may transmit the generated to the log information to the information gathering server 120 at a predetermined time or every time a predetermined time has passed (sometimes referred to hereinafter as the "log information transmission timing"). The log information transmission timing may be substantially the same as the log information generation timing, or may be different.

The log information generating section 226 may transmit the generated log information to the information gathering server 120 at least one of the timing at which the communication terminal 110 is activated, the timing at which the communication terminal 110 recovers from the sleep state, and the timing at which the program causing the computer to function as a portion of the communication terminal 110 is activated. The log information generating section 226 may store the generated log information during a period from when log information is transmitted to when the next log information is transferred.

The communication control section 228 controls the communication between the communication terminal 110 and the communication network 10, information providing server 20, and information gathering server 120. The communication control section 228 may be a communication interface. The communication control section 228 may compatible with a plurality of communication systems.

The present embodiment describes an example in which the information gathering server 120 is a server that differs from the information providing server 20, and the communication terminal 110 transmits the communication environment information to the information gathering server 120. However, the communication state analyzing system 100 is not limited to this embodiment. As another embodiment, the communication terminal 110 transmits the communication environment information to the information providing server 20. The information providing server 20 stores the communication environment information received from the communication terminal 110 in a storage apparatus. The information gathering server 120 analyzes the communication state based on the communication environment information stored in the information providing server 20. Furthermore, the functions of the components of the communication terminal 110 are not strictly separated, and the functions of the components in the communication terminal 110 are not limited to those described in the present embodiment.

The above embodiment describes an example in which, when the user instructions designating execution of a process other than a process for acquiring information relating to the communication environment are received, the communication terminal 110 comprehends a communication state near the actual usage state of the user over a wide area, by acquiring the communication environment information and the position information. However, the method for comprehending the communication state near the actual usage state of the user over a wide are is not particularly limited.

As another embodiment, after receiving input from the user designating the start of a process, the communication terminal 110 may automatically acquire information relating to the communication environment at a predetermined time or every time a predetermined time has passed. Since the user does not need to perform the manipulation for acquiring the communication environment information every time the communication environment information is acquired, a communication state close to the actual usage state of the user can be comprehended over a wide area. Furthermore, the change over time of the communication state can be comprehended.

In this case, the communication terminal 110 may transmit the communication environment information to the information gathering server 120 every time the communication environment information is acquired. The communication terminal 110 may store the acquired communication environment information and, according to predetermined conditions, transmit the stored communication environment information to the information gathering server 120. For example, the predetermined condition may be that the number of acquisitions of the communication environment information has reached a predetermined number, the amount of the stored communication environment information has reached a predetermined capacity, a predetermined time has been reached, or a predetermined time has passed. If communication cannot be implemented at the timing at which the communication environment information is to be sent to the information gathering server 120, the communication terminal 110 may store the acquired communication environment information without transmitting it, and then transmit the stored communication environment information at the next transmission timing.

FIG. 3 schematically shows an exemplary log information data table 300. The data table 300 may include the terminal ID 310, information relating to the date and time 320 at which the communication environment information was acquired, the position information 330 indicating the position at which the communication environment information was acquired, information relating to the GPS accuracy 340 at the time when the position information 330 was acquired, and the communication environment information 350. The communication environment information 350 may include information relating to the communication possibility 352, information relating to the data communication throughput 354, and information relating to the data communication latency 356. The terminal ID 310 is an example of identification information that identifies a computer.

In the present embodiment, the terminal ID 310 is a randomly selected code sequence that is updated every other day. In this way, the information gathering server 120 can analyze the log information by referencing the temporal relationship between pieces of log information, without specifying a user.

Figure 4:
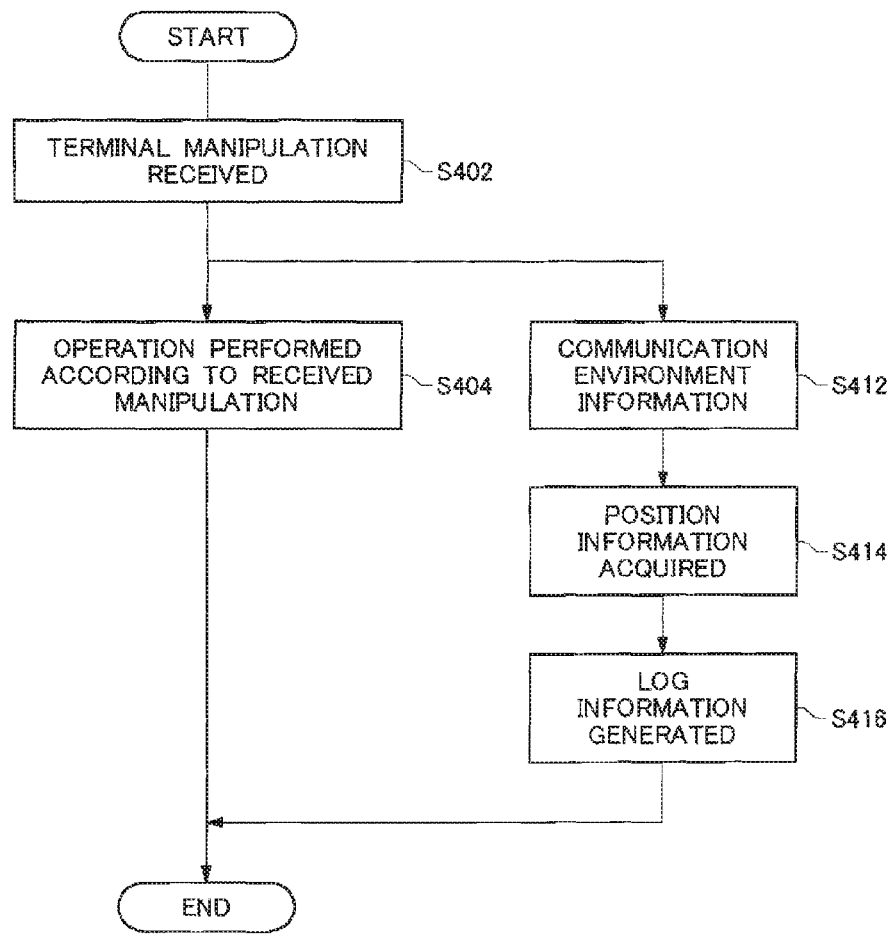
FIG. 4 schematically shows an exemplary operation of the communication terminal 110.

FIG. 4 schematically shows an exemplary operation of the communication terminal 110. FIG. 4 is used to describe an example in which the process designated by the user instructions is a process that does not use the communication function, and the communication terminal 110 generates the log information without accessing the information providing server 20.

With the present embodiment, at step 402 (hereinafter, "step" may be abbreviated as "S"), the input section 212 receives from the user the user instructions relating to a manipulation of the communication terminal 110. For example, the input section 212 receives user instructions for scrolling the screen. At S404, the process executing section 214 performs the process corresponding to the manipulation designated by the user instructions.

On the other hand, at S412, in the background during S404, the environment information acquiring section 216 acquires the communication environment information. The environment information acquiring section 216 may perform the communication environment information acquisition procedure a plurality of times during a predetermined period, in response to the input section 212 receiving the user instructions. In a case where the process designated by the user instructions does not use the communication function, the environment information acquiring section 216 acquires information relating to at least the communication possibility. If communication is possible, the environment information acquiring section 216 may acquire information relating to at least one of the radio wave strength, communication system, and communication carrier. At this time, the identification information acquiring section 224 may analyze the communication packets and extract the connection carrier identification information included in the communication packets. The identification information acquiring section 224 may acquire the connection carrier identification information by accessing the OS.

At step S414, in the background of S404, the position information acquiring section 218 acquires the position information. After step S414, at step S416, in the background of S404, the log information generating section 226 generates the log information, and the process is ended. In the present embodiment, the timing and order of each step can be altered as needed within a range that does not result in any technical contradictions.

Figure 5:
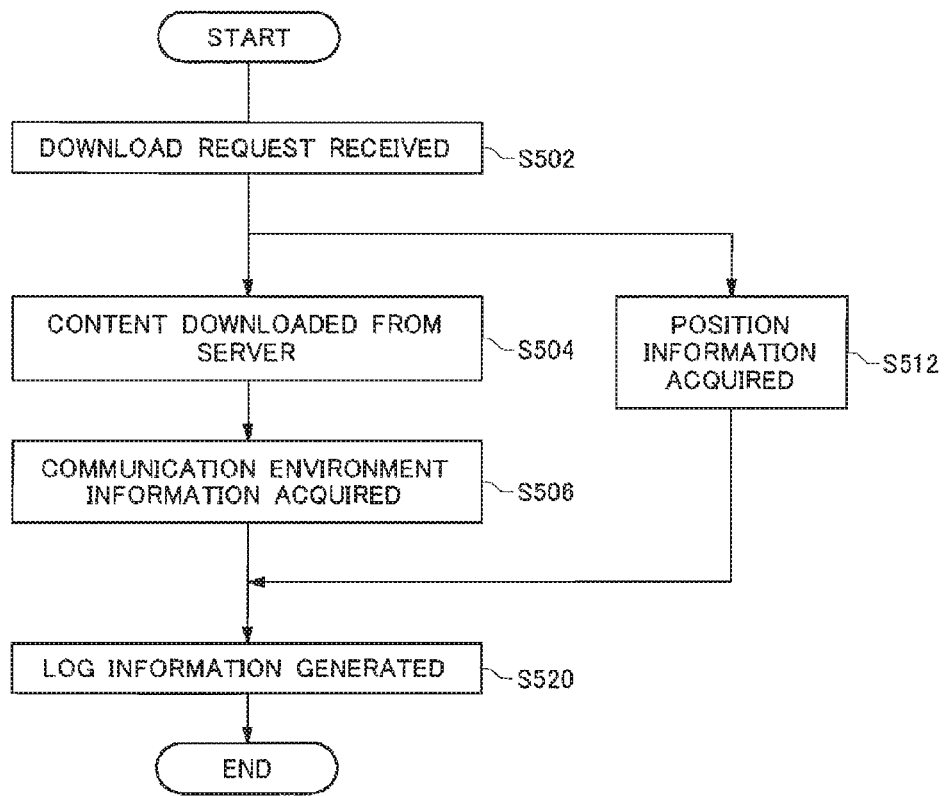
FIG. 5 schematically shows another operation of the communication terminal 110.

FIG. 5 schematically shows another operation of the communication terminal 110. FIG. 5 is used to describe an example in which the process designated by the user instructions is a process that uses the communication function, and the communication terminal 110 generates the log information by accessing the information providing server 20.

In the present embodiment, at S502, the input section 212 receives from the user the user instructions for accessing the information providing server 20 and acquiring the information indicated by the user from the information providing server 20. For example, the input section 212 receives user instructions to acquire information relating to restaurants that match search conditions. At S504, the process executing section 214 performs the process designated by the user instructions, and downloads the corresponding content from the information providing server 20.

At S506, the environment information acquiring section 216 acquires the communication environment information. The environment information acquiring section 216 may perform the communication environment information acquisition procedure a plurality of times during a predetermined period, in response to the input section 212 receiving the user instructions. At this time, the identification information acquiring section 224 may analyze the communication packets and extract the connection carrier identification information included in the communication packets. The identification information acquiring section 224 may acquire the connection carrier identification information by accessing the OS. The process of S506 may be performed in the background.

The environment information acquiring section 216 may acquire at least the information relating to the communication possibility. In a case where the process designated by the user instructions uses the communication function, the environment information acquiring section 216 may also acquire information relating to at least one of the radio wave state, the radio wave strength, the communication speed, the data communication throughput, the data communication latency, the communication system, and the communication carrier. The environment information acquiring section 216 may acquire the communication environment information based on the amount of information and the period from when the request for the transmission of the information designated by the user request is made to the information providing server 20 to when this information is acquired from the information providing server 20.

On the other hand, at step S512, in the background of at least one of S504 and S506, the position information acquiring section 218 acquires the position information. After S506 and S512, at S520, the log information generating section 226 generates the log information and the process is ended. The process of S520 may be performed in the background. In the present embodiment, the timing and order of each step can be altered as needed within a range that does not result in any technical contradictions.

Figure 6:
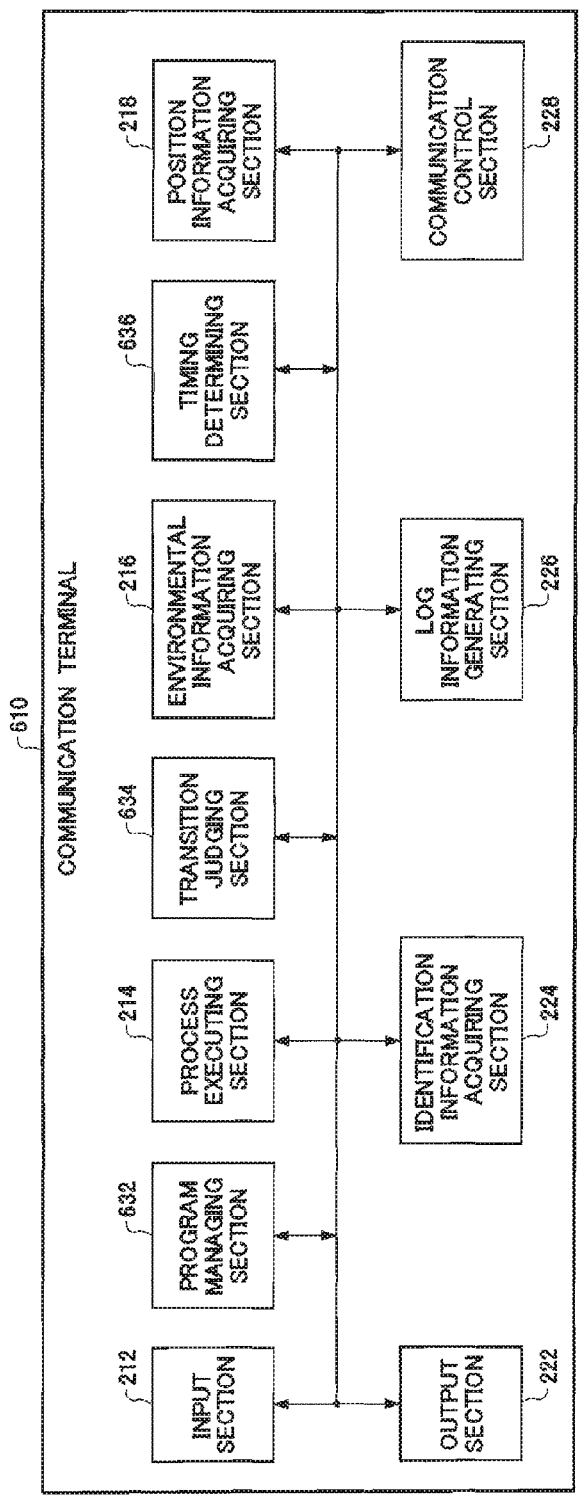
FIG. 6 schematically shows an exemplary communication terminal 610.

FIG. 6 schematically shows an exemplary communication terminal 610. The communication terminal 610 may form a portion of the communication state analyzing system 100 in place of the communication terminal 110 or together with the communication terminal 110. The communication terminal 610 differs from the communication terminal 110 by including a program managing section 632, a transition judging section 634, and a timing determining section 636. The communication terminal 610 may have the same configuration as the communication terminal 110 with respect to all points other than the difference described above.

Concerning the communication terminal 110, it was stated that the environment information acquiring section 216 may perform the process of acquiring the communication environment in the background and the position information acquiring section 218 may perform the process of acquiring the position information in the background. However, depending on the OS (Operating System) of the communication terminal, there are cases where the operation of programs in the background is limited.

For example, in iOS (Registered Trademark) manufactured by Apple Inc., there are two activation states respectively for the foreground state and the background state. Specifically, in the foreground state there are two operating states, one of which is a state where a program is in the foreground but is not being used (referred to as "inactive") and the other of which is a state where a program is in the foreground and is being used (referred to as "active"). In the background state there are two operating states, one of which is a state where a program is in the background and still operating (referred to as "background" or "background running") and the other of which is a state where a program is in the background and is not operating (referred to as "suspended").

With iOS, when a predetermined time has passed from after a program transitions to the background running state, the program is forcibly transitioned to the suspended state, except for certain unusual processes. When the program transitions to the suspended state, the program cannot continue processing, and therefore, when the program for realizing the environment information acquiring section 216 transitions to the suspended state, for example, the process for acquiring the communication environment can no longer be performed in the background.

With the communication terminal 610, an information processing apparatus, method, and program are provided that, even if operation of a program in the background is limited by the OS, can perform the process for acquiring the communication environment when the position of the communication terminal 610 changes by more than a predetermined amount. In this case, the communication terminal 610 may perform the process of acquiring the communication environment in the background.

The components of the communication terminal 610 may be realized by hardware, software, or a combination of hardware and software, in the same manner as the components of the communication terminal 110. By executing a program, a computer may function as a portion of the communication terminal 610. The program may be stored in a computer-readable medium such as a CD-ROM, DVD-ROM, memory, or hard disk, or may be stored in a storage apparatus connected to the network. The program may be installed in the computer of the communication terminal 610 from the storage apparatus connected to the network or the computer-readable medium. The communication terminal 610 is an example of an information processing apparatus that has a communication function and includes a processor and a storage apparatus that stores the commands or programs to be executed by the processor.

The program managing section 632 manages the operating state of the program operating on the communication terminal 610. In the present embodiment, the program managing section 632 manages the operating state of the program for acquiring the information relating to the communication environment of the communication terminal 610. The program for acquiring the information relating to the communication environment of the communication terminal 610 may be a program that causes a computer of the communication terminal 610 to function as at least the environment information acquiring section 216. The program for acquiring the information relating to the communication environment of the communication terminal 610 may be a program that causes the computer of the communication terminal 610 to function as each component of the communication terminal 610. The program managing section 632 may be a portion of the functions provided by the OS of the communication terminal 610, or an OS module of the communication terminal 610 may function as the program managing section 632 by being read to the computer of the communication terminal 610.

When the information indicating the occurrence of a predetermined type of event is acquired, the program managing section 632 transmits information indicating the occurrence of the event to one or more programs that are in the background and not operating. Upon receiving, from the program that received the above information, a request to change the operating state of this program, the program managing section 632 changes the operating state of the program according to the request. The program managing section 632 is an example of a position change information acquiring section that acquires position change information.

In the present embodiment, when information is acquired indicating that the positional change amount of the communication terminal 610 has exceeded a predetermined value, the program managing section 632 transmits this information or information indicating the acquisition of this information (these types of information are examples of the position change information) to the one or more programs that are in the background and not operating. Upon receiving, from one of the one or more programs that received the above information, a request to change the operating state of the program, the program managing section 632 changes the operating state of the program. In this way, the program for acquiring the information relating to the communication environment of the communication terminal 610 transitions from the state in which the program is in the background and not operating, i.e. the suspended state, to the state in which the program is operating in the background, i.e. the background running state.

The program managing section 632 may acquire the information indicating that the positional change amount of the communication terminal 610 has exceeded the predetermined value from an external server, not shown, via the communication network 10. For example, regardless of the operating state of the program operating on the communication terminal 610, radio waves are received from a base station or access point (sometimes referred to hereinafter as a "base station etc."). The radio waves from the base station etc. include the identification information that identifies the base station or access point. The communication terminal 610 periodically transmits the base station identification information, which is included in the radio waves from the base station, to the server that stores the base station identification information in association with the position information of this base station.

When the positional change of the communication terminal 610 fulfills a predetermined condition, the server transmits to the communication terminal 610 the information indicating that the positional change amount of the communication terminal 610 has exceeded the predetermined value. The program managing section 632 acquires the above information via the communication control section 228, for example. In this way, when the position of the communication terminal 610 changes significantly while power consumption of the communication terminal 610 is being restricted, the operating state of a specified program can be changed.

The present embodiment describes an example in which the program managing section 632 acquires the information that the positional change amount of the communication terminal 610 has exceeded the predetermined value from an external server. However, the program managing section 632 is not limited to this embodiment. For example, the program managing section 632 may acquire the position information of the communication terminal 610 from the position information acquiring section 218, and judge whether the positional change amount of the communication terminal 610 has exceeded the predetermined value. When it is judged that the positional change amount of the communication terminal 610 has exceeded the predetermined value, the program managing section 632 may transmit, to the one or more programs that are in the background and not operating, the information indicating that the positional change amount of the communication terminal 610 has exceeded the predetermined value (this information is an example of the position change information).

The transition judging section 634 receives from the program managing section 632 information indicating that an event has occurred. The transition judging section 634 judges whether to transition the operating state of the program. When the above event included in the received information is a predetermined event for transitioning the operating state of the program, the transition judging section 634 determines that the operating state of the program is to be transitioned. Upon determining that the operating state of the program is to be transitioned, the transition judging section 634 transmits to the program managing section 632 a request to transition the operating state of the program. The transition judging section 634 is an example of a position change information acquiring section that acquires position change information.

In the present embodiment, the transition judging section 634 is a program module for acquiring information relating to the communication environment of the communication terminal 610 and, upon receiving from the program managing section 632 information indicating that a predetermined type of event has occurred, judges whether to transition the operating state of the program for acquiring the information relating to the communication environment of the communication terminal 610. When information indicating that the positional change amount of the communication terminal 610 has exceeded the predetermined value or information indicating the acquisition of such information is included in the information received from the program managing section 632, the transition judging section 634 determines that the operating state of the program for acquiring the information relating to the communication environment of the communication terminal 610 is to be transitioned from a state in which the program is in the background and not operating to a state in which the program is operating in the background.

In the present embodiment, even when the program for acquiring the information relating to the communication environment of the communication terminal 610 is in the background and not operating, the program can be transitioned to a state of operating in the background when the communication terminal 610 has moved a certain distance. In this way, the communication terminal 610 can execute the process for acquiring the information relating to the communication environment in the background.

The timing determining section 636 determines the timing at which the communication terminal 610 executes the process for acquiring the information relating to the communication environment of the communication terminal 610. The timing determined by the timing determining section 636 may be a given timing within a predetermined period from when the program for acquiring the information relating to the communication environment of the communication terminal 610 has transitioned from the foreground state or a state of being in the background and not operating to a state of operating in the background.

The timing determining section 636 may determine the above timing according to predetermined rules. In the present embodiment, the timing determining section 636 may determine the above timing randomly, by using a random number table or a random number generating algorithm. In this way, biasing in the data can be prevented. As another embodiment, the timing determining section 636 stores the determined timing every time the above timing is determined, and may determine the timing such that the time from when the program has transitioned to the background operating state to when the process for acquiring the information relating to the communication environment is acquired follows a predetermined distribution. In this way, biasing of the data can be prevented, and data suitable for the intended use can be gathered.

Figure 7:
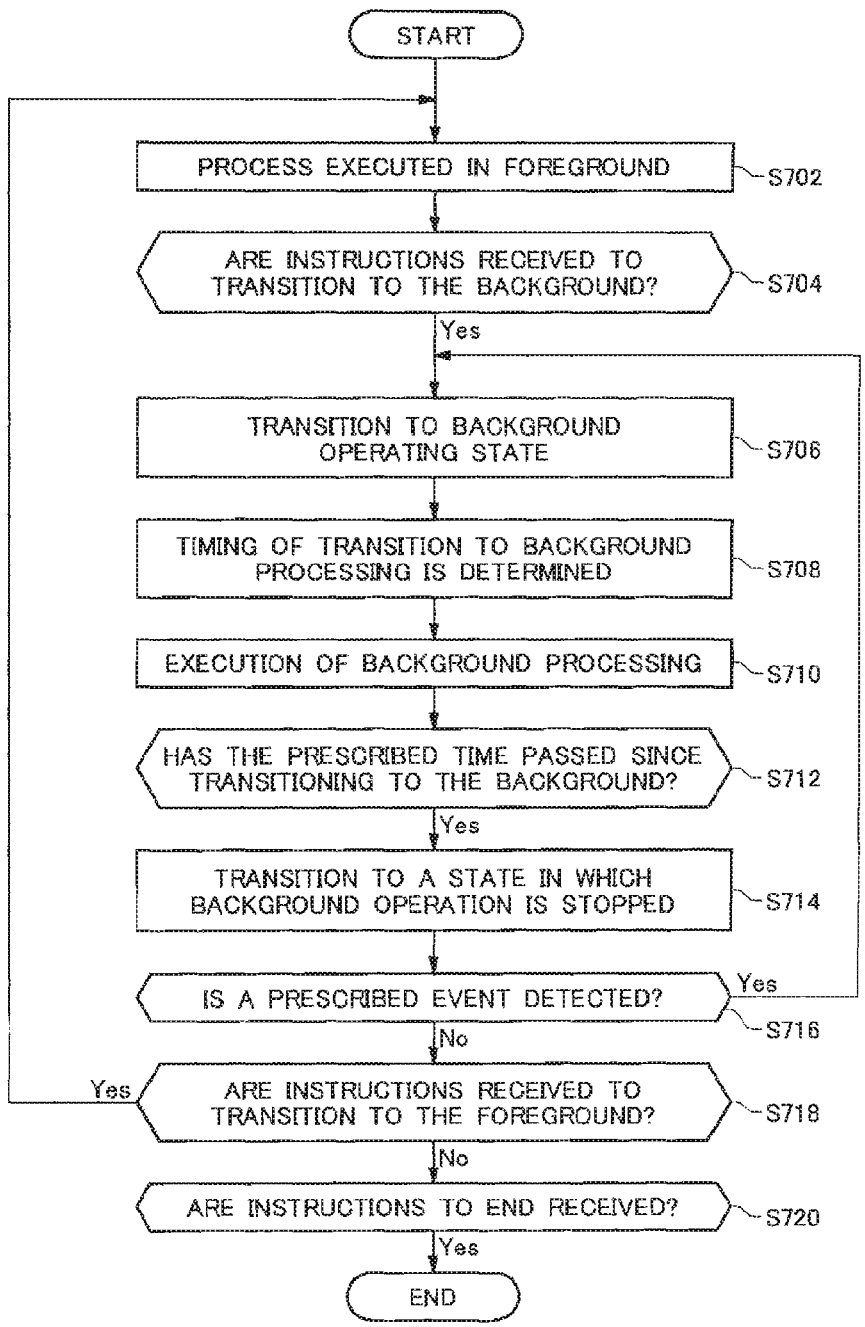
FIG. 7 schematically shows an exemplary operation of the communication terminal 610.

FIG. 7 schematically shows an exemplary operation of the communication terminal 610. The present embodiment describes the operations of the components of the communication terminal 610 using an example in which the program for acquiring the information relating to the communication environment of the communication terminal 610 causes the computer of the communication terminal 610 to function as the input section 212, the process executing section 214, the environment information acquiring section 216, the position information acquiring section 218, the output section 222, the identification information acquiring section 224, the log information generating section 226, the transition judging section 634, and the timing determining section 636, and the OS of the communication terminal 610 causes the computer of the communication terminal 610 to function as the communication control section 228 and the program managing section 632.

At S702, the program for acquiring the information relating to the communication environment of the communication terminal 610 is performed in the foreground. For example, the input section 212 performs a process for receiving the user instructions. The process executing section 214 performs the process for executing the process designated by the user instructions. The environment information acquiring section 216 performs the process for acquiring information relating to the communication environment of the communication terminal 610, when the user instructions are received or when the process designated by the user instructions is performed. The position information acquiring section 218 performs the process for acquiring the position information of the communication terminal 610, when the user instructions are received or when the process designated by the user instructions is performed.

At S704, the program managing section 632 judges whether the input section 212 has received transition instructions from the user for transitioning the operating state of the program for acquiring the information relating to the communication environment of the communication terminal 610 to the background. Here, the background state includes both the "background running" state in which the program operates in the background and the "suspended" state in which the program is in the background and not operating.

When the program managing section 632 has judged at S704 that transition instructions have been received from the user (the "Yes" of S704), at S706, the program managing section 632 transitions the program for acquiring the information relating to the communication environment of the communication terminal 610 to the background operating state. At S708, the timing determining section 636 determines the timing at which the environment information acquiring section 216 is to execute the process for acquiring the information relating to the communication environment of the communication terminal 610.

At S710, the environment information acquiring section 216 performs the process for acquiring the information relating to the communication environment of the communication terminal 610 in the background, at the timing determined by the timing determining section 636. The communication environment information acquired at S710 can be exemplified by information relating to communication possibility, radio wave state (e.g. radio wave reception level, radio wave strength, RSCP (Received Signal Code Power), CID (Cell ID)), communication system, or communication carrier. The position information acquiring section 218, the identification information acquiring section 224, and the log information generating section 226 may each perform a process at the timing when the environment information acquiring section 216 performs a process.

At S712, after the program for acquiring the information relating to the communication environment of the communication terminal 610 has transitioned to the background operating state, the program managing section 632 judges whether a predetermined time has passed. If the program managing section 632 determines at S712 that the predetermined time has passed (the "Yes" of S712), at S714, the program managing section 632 transitions the program for acquiring the information relating to the communication environment of the communication terminal 610 to the non-operational background state.

At S716, when the occurrence of a predetermined type of even is detected, the program managing section 632 transmits to the transition judging section 634 information indicating the occurrence of the event. In the present embodiment, the program managing section 632 receives information indicating that the positional change amount of the communication terminal 610 has exceeded a predetermined value, from an external server (not shown) via the communication network 10 and the communication control section 228, and transmits this information or information indicating the acquisition of this information to the transition judging section 634.

The transition judging section 634 acquires the information indicating the occurrence of the predetermined type of event when the program for acquiring the information relating to the communication environment of the communication terminal 610 is in the non-operational background state. When the transition judging section 634 has judged that the event included in the information received from the program managing section 632 is a predetermined event for transitioning the operating state of the program (the "Yes" of S716), the transition judging section 634 transmits to the program managing section 632 a request for transitioning the operating state of the program. The predetermined event for transitioning the operating state of the program may be the positional change amount of the communication terminal 610 exceeding a predetermined value. Upon receiving the request to transition the operating state of the program, the program managing section 632 transitions the program for acquiring the information relating to the communication environment of the communication terminal 610 to the background operating state.

On the other hand, when the transition judging section 634 has judged that a predetermined event for transitioning the operating state of the program has not occurred (the "No" of S716), the process proceeds to S718. At S718, the program managing section 632 judges whether transition instructions for transitioning the program for acquiring the information relating to the communication environment of the communication terminal 610 to the foreground state have been received from the user by the input section 212.

When the program managing section 632 has determined at S718 that transition instructions have been received from the user (the "Yes" of S718), the program managing section 632 transitions the program for acquiring the information relating to the communication environment of the communication terminal 610 to the foreground state. On the other hand, when the program managing section 632 has determined at S718 that transition instructions have not been received from the user (the "No" of S718), the process proceeds to S720.

At S720, the program managing section 632 judges whether the input section 212 has received end instructions for the program for acquiring the information relating to the communication environment of the communication terminal 610 from the user. When the program managing section 632 judges at S720 that the end instructions have been received from the user (the "Yes" of S720), the program managing section 632 ends the program for acquiring the information relating to the communication environment of the communication terminal 610, and the process is finished.

The present embodiment describes an example in which, when the program managing section 632 determines at S704 that the transition instructions have been received from the user, at S706, the program managing section 632 transitions the program for acquiring the information relating to the communication environment of the communication terminal 610 to the background operating state and the communication terminal 610 performs the processes of S708 to S712. However, the operations of the communication terminal 610 are not limited to those described in the present embodiment. As another embodiment, when the program managing section 632 determines at S704 that the transition instructions have been received from the user, the processes of S708 to S712 are skipped, and the program managing section 632 may transition the program for acquiring the information relating to the communication environment of the communication terminal 610 to the non-operational background state.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

[Item 1]

A program for acquiring information relating to a communication environment, wherein the program causes a computer having a communication function to perform:

a user instruction receiving procedure to receive user instructions designating execution of a process other than a process for acquiring information relating to the communication environment;

a process execution procedure to execute the process designated by the user instructions;

a communication environment information acquisition procedure to acquire information relating to the communication environment of the computer, when the user instructions are received or when the process indicated by the user instructions is executed; and a position information acquisition procedure to acquire position information of the computer, when the user instructions are received or when the process indicated by the user instructions is executed.

[Item 2]

The program according to Item 1, wherein the program causes the computer to display an image, and the process other than the process for acquiring the information relating to the communication environment changes a display position of the displayed image.

[Item 3]

The program according to Item 1 or Item 2, causing the computer to perform an output procedure to output information acquired from a server connected to the computer via a network, in a format that can be understood by a user of the computer, wherein the process other than the process for acquiring the information relating to the communication environment is a process of acquiring information designated by the user instructions from the server, and the communication environment information acquisition procedure includes acquiring the information relating to the communication environment based on an amount of information designated by the user and on a time period from when a request to transmit the information designated by the user was issued to the server to when the information designated by the user was acquired from the server.

[Item 4]

The program according to any one of Items 1 to 3, further causing the computer to perform a log information generation procedure to generate log information in which the information relating to the communication environment of the computer is associated with the position information of the computer.

[Item 5]

The program according to Item 4, wherein the position information acquisition procedure includes acquiring the position information of the computer and information relating to GPS accuracy, based at least on GPS information, and the log information associates the information relating to the GPS accuracy, the information relating to the communication environment of the computer, and the position information of the computer with each other.

[Item 6]

The program according to Item 4 or 5, further causing the computer to perform an identification information procedure to acquire identification information that identifies the computer, wherein the log information associates the identification information, the information relating to the communication environment of the computer, and the position information of the computer with each other.

[Item 7]

The program according to any one of Items 1 to 6, further causing the computer to perform:

a positional change information acquiring procedure to, while in a state where the program is in a background but not operating, acquire position change information indicating that a positional change amount of the computer has exceeded a predetermined value;

a transition procedure to, when the position change information has been acquired, transition to a state in which the program operates in the background; and a communication environment information acquisition procedure to, while in a state where the program is operating in the background, acquire the information relating to the communication environment of the computer.

[Item 8]

The program according to any one of Items 1 to 7, further causing the computer to perform a performance timing determination procedure to randomly determine a timing within a predetermined period from when the program transitions to a state of operating in a background from a state of operating in a foreground or a state of being in the background but not operating, at which the computer is to perform the communication environment information acquisition procedure.

[Item 9]

A program for acquiring information relating to a communication environment, wherein the program causes a computer having a communication function to perform:

a communication environment information acquisition procedure to acquire information relating to the communication environment of the computer;

a position information acquisition procedure to acquire position information of the computer; and a performance timing determination procedure to randomly determine a timing within a predetermined period from when the program transitions to a state of operating in a background from a state of operating in a foreground or a state of being in the background but not operating, at which the computer is to perform the communication environment information acquisition procedure.

[Item 10]

The program according to any one of Items 1 to 9, further causing the computer to perform:

a connection carrier information acquisition procedure to acquire connection carrier identification information for identifying a communication carrier of a communication network to which the computer is connected at a position where the position information was acquired; and a log information generation procedure to generate log information in which the position information and the connection carrier identification information are associated with each other.

[Item 11]

A program for acquiring information relating to a communication environment, causing a computer having a communication function to perform:

a positional change information acquisition procedure to, while in a state where the program is in a background but not operating, acquire position change information indicating that a positional change amount of the computer has exceeded a predetermined value;

a transition procedure to, when the position change information has been acquired, transition to a state in which the program operates in the background; and a communication environment information acquisition procedure to, while in a state where the program is operating in the background, acquire the information relating to the communication environment of the computer.

[Item 12]

The program according to Item 11, further causing the computer to perform a performance timing determination procedure to randomly determine a timing within a predetermined period from when the program transitions to a state of operating in a background from a state of operating in a foreground or a state of being in the background but not operating, at which the computer is to perform the process of acquiring the communication environment information.

[Item 13]

The program according to Item 11 or 12, further causing the computer to perform:

a position information acquisition procedure to acquire position information of the computer;

a connection carrier information acquisition procedure to acquire connection carrier identification information for identifying a communication carrier of a communication network to which the computer is connected at a position where the position information was acquired; and a log information generation procedure to generate log information in which the position information and the connection carrier identification information are associated with each other.

[Item 14]

The program according to any one of Items 1 to 13, further causing the computer to perform:

a first communication environment information acquisition procedure to acquire the information relating to the communication environment when a predetermined event has occurred; and a second communication environment information acquisition procedure to acquire the information relating to the communication environment during a predetermined first period from when the first communication environment information acquisition procedure was performed, wherein the predetermined event is at least one event selected from a group made up of (i) receiving user instructions designating the performance of a process other than the process for acquiring the information relating to the communication environment, (ii) passage of a predetermined second period from when the program transitioned to a background operating state, (iii) passage of a predetermined third period from when the process for acquiring the information relating to the communication environment was previously performed, and (iv) reaching a predetermined time, and the first period is shorter than the second period or the third period.

[Item 15]

An information processing apparatus that acquires information relating to a communication environment, comprising:

a user instruction receiving section for receiving user instructions designating execution of a process other than a process for acquiring the information relating to the communication environment;

a process executing section for executing the process designated by the user instructions;

a communication environment information acquiring section for acquiring information relating to the communication environment of the information processing apparatus, when the user instructions are received or when the process indicated by the user instructions is executed; and a position information acquiring section for acquiring position information of the information processing apparatus, when the user instructions are received or when the process indicated by the user instructions is executed.

[Item 16]

A method for acquiring information relating to a communication environment of an information processing apparatus, the method comprising:

a user instruction receiving step to receive user instructions designating execution of a process other than a process for acquiring information relating to the communication environment;

a process execution step to execute the process designated by the user instructions;

a communication environment information acquisition step to acquire information relating to the communication environment of the information processing apparatus, when the user instructions are received or when the process indicated by the user instructions is executed; and a position information acquisition step to acquire position information of the information processing apparatus, when the user instructions are received or when the process indicated by the user instructions is executed.

LIST OF REFERENCE NUMERALS

10: communication network, 20: information providing server, 100: communication state analyzing system, 110: communication terminal, 120: information gathering server, 210: communication terminal, 212: input section, 214: process executing section, 216: environment information acquiring section, 218: position information acquiring section, 222: output section, 224: identification information acquiring section, 226: log information generating section, 228: communication control section, 300: data table, 310: terminal ID, 320: date and time, 330: position information, 340: GPS accuracy, 350: communication environment information, 352: communication possibility, 354: throughput, 356: latency, 610: communication terminal, 632: program managing section, 634: transition judging section, 636: timing determining section

What is claimed is:

1. An information processing apparatus comprising:
a processor configured to
communicate to a communication network;
acquire position information;
acquire connection carrier identification information for identifying a communication carrier of a communication network to which the communication is made at a position where the position information was acquired; and
generate log information in which the position information and the connection carrier identification information are associated with each other, wherein the processor is further configured to
acquire information relating to the communication environment at the position where the position information was acquired, and
generate the log information in which the position information, the connection carrier identification information, and the information relating to the communication environment are associated with each other,
wherein the processor is further configured to perform:
a first communication environment information acquisition procedure to acquire the information relating to the communication environment when a predetermined event has occurred; and
a second communication environment information acquisition procedure to acquire the information relating to the communication environment during a predetermined first period from when the first communication environment information acquisition procedure was performed, and
wherein
the predetermined event is at least one event selected from a group made up of (i) receiving user instructions designating the performance of a process other than the process for acquiring the information relating to the communication environment, (ii) passage of a predetermined second period from when the process for acquiring the information relating to the communication environment at the position where the position information was acquired transitioned to a background operating state, (iii) passage of a predetermined third period from when the process for acquiring the information relating to the communication environment was previously performed, and (iv) reaching a predetermined time, and
the first period is shorter than the second period or the third period.

2. The information processing apparatus according to claim 1, wherein the processor is further configured to
acquire contract carrier identification information for identifying a communication carrier contracted to provide the information processing apparatus with a communication service, and
generate the log information in which the position information, the connection carrier identification information, and the contract carrier identification information are associated with each other.

3. The information processing apparatus according to claim 1, wherein the processor is further configured to
transmit the log information to a server that gathers the log information.

4. A computer-readable non-transitory storage medium storing thereon a program causing a computer to function as the information processing apparatus according to claim 1.

5. The information processing apparatus according to claim 1, wherein the user instructions include at least one of a process for turning OFF a power supply of the information processing apparatus, a process of logging off from the information processing apparatus and a process for setting the information processing apparatus to a sleep state.

6. The information processing apparatus according to claim 1, wherein the processor is further configured to perform the process for acquiring the position information, the process for acquiring the connection carrier identification information and the process for generating the log information when information is acquired indicating that a positional change amount of the information processing apparatus has exceeded a predetermined value.

7. The information processing apparatus according to claim 1, wherein the processor is further configured to acquire the connection carrier identification information by analyzing communication packets and extracting the connection carrier identification information included in the communication packets.

8. The information processing apparatus according to claim 7, wherein the connection carrier identification information includes an MCC (Mobile Country Code) and an MNC (Mobile Network Code).

9. An information processing apparatus comprising:
a processor configured to
communicate to a communication network;
acquire information relating to a communication environment,
perform a first communication environment information acquisition procedure to acquire the information relating to the communication environment when a predetermined event has occurred; and
perform a second communication environment information acquisition procedure to acquire the information relating to the communication environment during a predetermined first period from when the first communication environment information acquisition procedure was performed,
wherein
the predetermined event is at least one event selected from a group made up of (ii) passage of a predetermined second period from when the process for acquiring the information relating to a communication environment transitioned to a background operating state, and (iii) passage of a predetermined third period from when the process for acquiring the information relating to the communication environment was previously performed and
the first period is shorter than the second period or the third period.

10. The information processing apparatus according to claim 9, wherein the processor is further configured to
perform the second communication environment information acquisition procedure when a predetermined fourth period has passed from when the first communication environment information acquisition procedure was performed, and
the fourth period is equal to the first period or shorter than the first period.

11. The information processing apparatus according to claim 9, wherein at least one of the first communication environment information acquisition procedure and the second communication environment information acquisition procedure includes:
a procedure to transmit a request to an external information processing apparatus;
a procedure to receive a response to the request from the external information processing apparatus; and
a procedure to judge communication to be impossible when the response is not received during a predetermined fifth period.

12. The information processing apparatus according to claim 9, wherein the processor is further configured to
acquire position information of a position where the information relating to the communication environment of the information processing apparatus was acquired; and
generate the log information in which the position information and the information relating to the communication environment are associated with each other.

13. A computer-readable non-transitory storage medium storing thereon a program causing a computer to function as the information processing apparatus according to claim 9.

14. An information processing apparatus comprising:
a processor configured to
communicate to a communication network;
acquire position information;
acquire connection carrier identification information for identifying a communication carrier of a communication network to which the communication is made at a position where the position information was acquired; and
generate log information in which the position information and the connection carrier identification information are associated with each other,
wherein
an operation system (OS) of the information processing apparatus includes a foreground state and a background state, the background state including a first state where a program is in the background and still operating and a second state where a program is in the background and is not operating; and
wherein the processor is further configured to
transit a state of a process for acquiring information relating to a communication environment to the first state when an occurrence of a predetermined type of even is detected in a state that the process for acquiring the information relating to the communication environment is in the second state, and then perform the process for acquiring the position information, the process for acquiring the connection carrier identification information and the process for generating the log information; and
transit a state of the process for acquiring information relating to the communication environment to the foreground state when transition instructions from a user are received in a state that the process for acquiring the information relating to the communication environment is in the second state, and then perform the process for acquiring the position information, the process for acquiring the connection carrier identification information and the process for generating the log information.

15. The information processing apparatus according to claim 14, wherein the processor is further configured to acquire contract carrier identification information for identifying a communication carrier contracted to provide the information processing apparatus with a communication service, and generate the log information in which the position information, the connection carrier identification information, and the contract carrier identification information are associated with each other.

16. The information processing apparatus according to claim 14, wherein the processor is further configured to transmit the log information to a server that gathers the log information.

17. A computer-readable non-transitory storage medium storing thereon a program causing a computer to function as the information processing apparatus according to claim 14.

18. The information processing apparatus according to claim 14, wherein the processor is further configured to acquire the connection carrier identification information by analyzing communication packets and extracting the connection carrier identification information included in the communication packets.

19. The information processing apparatus according to claim 18, wherein the connection carrier identification information includes an MCC (Mobile Country Code) and an MNC (Mobile Network Code).

* * * * *